United States Patent Office 3,456,501
Patented July 22, 1969

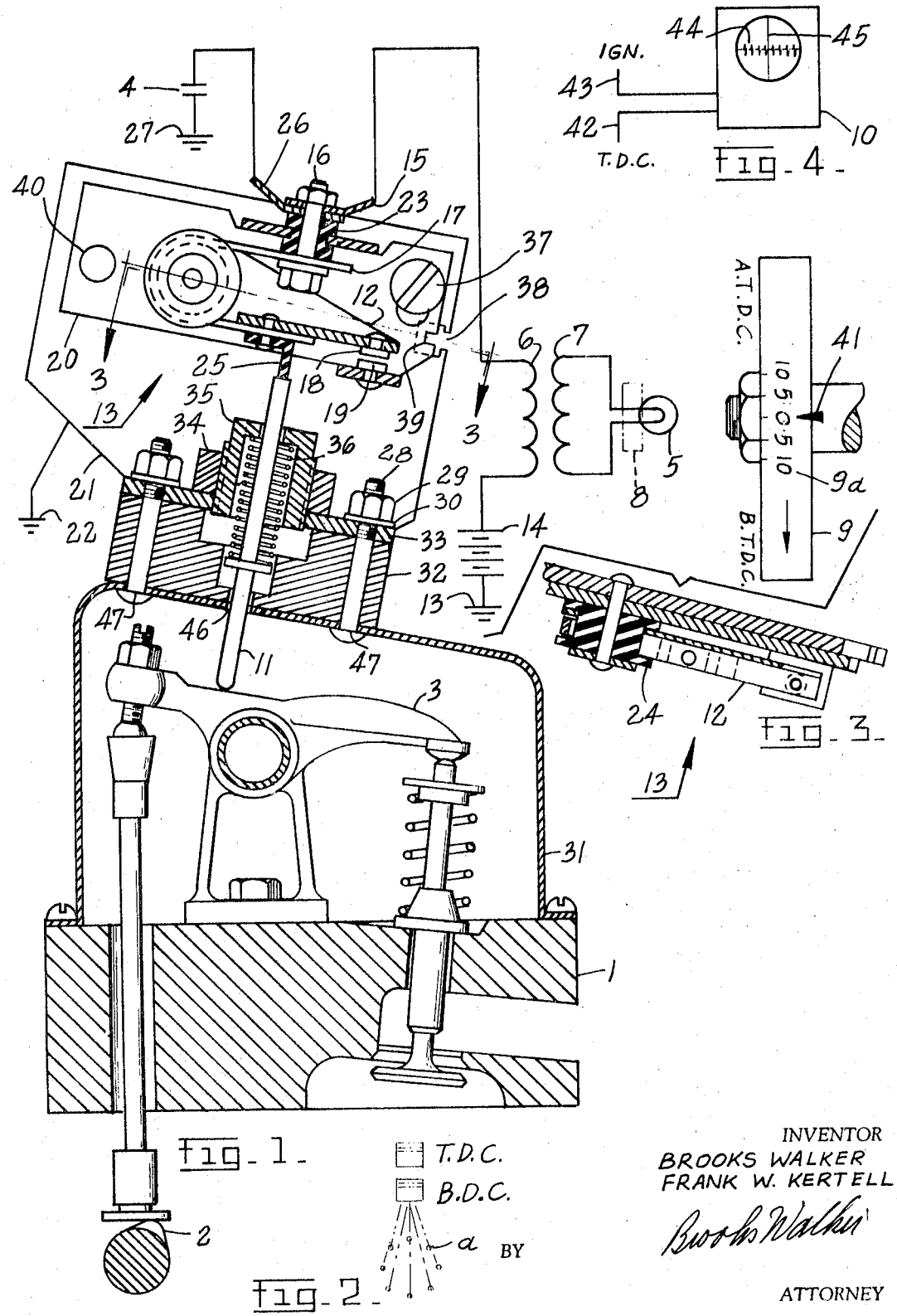

3,456,501
ENGINE TIMING DEVICE
Brooks Walker, 1280 Columbus Ave., San Francisco, Calif. 94133, and Frank W. Kertell, Santa Cruz, Calif.; said Kertell assignor to said Walker
Filed Jan. 31, 1967, Ser. No. 613,028
Int. Cl. G01m 13/02
U.S. Cl. 73—118                                 4 Claims

ABSTRACT OF THE DISCLOSURE

An indicating device for indicating the top dead center of a piston of an internal combustion engine. A switch is operated by the rocker arm to actuate a circuit for energizing an indicator. In one form of the invention the indicator is a lamp for illuminating the graduations on a flywheel. In a second form of the invention the indicator is the trace of an oscilloscope.

---

The invention relates to a component of a testing device for internal combustion engines and in particular to a device whereby the occurrence of the top dead center condition may be visually demonstrated.

Devices to accomplish this objective are known to the art. However, they require for their operation certain modifications of the engine, e.g. the installation of special cams. It is now proposed that in an engine having several pistons, each of which has associated therewith auxiliary elements which moves according to the movement of the piston, the movement of one of such auxiliary elements, e.g. valve lifter components, may be utilized to trigger pulsations in an electrical circuit which then may be used to effect visual demonstration of the top dead center condition, e.g. by means of a strobe lamp illuminating a flywheel or in an oscilloscope or similar apparatus.

Because of the overlap in valve timing in internal combustion engines and because of the fact that intake and exhaust valves both move rapidly to lift or close well before top or bottom dead center, it may be possible to use a fast moving valve of the cylinder in question as a top dead center indicator, rather than the motion of the valve actuating mechanism for another cylinder.

It is one object of the invention to provide an improved top dead center checking device operated by mechanism on a normal internal combustion engine.

It is another object of the invention to provide a simple top dead center device and in particular a device of this kind which can be used with any engine without requiring additional actuating expensive modification or adaptation thereof.

It is a third object of the invention to provide a top dead center checking device which will make the large scale testing of engines economically feasible in a short time for testing each and provide top dead center information on such tests and therefore information on spark advance, etc.

It is a fourth object of the invention to teach the utilization of valve lifter components, especially valve rocker arms, as actuating elements in top dead center testing devices.

It is a fifth object of the invention to provide a top dead center testing device which is inexpensive enough to be incorporated in the standard or low priced optional equipment of internal combustion engines.

It is a sixth object of the invention to provide a top dead center checking component which is adapted for use with standard display devices, e.g. oscilloscopes and the like which may be used for ignition and other analysis.

These and other objects and advantages of the invention will become apparent from the following detailed description of the invention in connection with the drawings wherein:

FIG. 1 shows a modified vertical section, partly cut away, through a part of an inter-combustion engine embodying one form of the device according to the invention.

FIG. 2 shows the movement of the pistons of an internal combustion engine in diagrammatic form.

FIG. 3 shows a detail of FIG. 1 in the form of a section taken along a line 3—3 in FIG. 1.

FIG. 4 shows a visual display device actuated in part by the device according to the invention.

In all figures like numerals of reference refer to corresponding parts.

FIG. 1 shows an engine head 1 and one set of auxiliary elements commonly associated with the pistons of internal combustion engines, in particular a valve lifter rocker arm 3, and a valve lifter cam 2. As the function and operation of these elements is well known in the art and no modification thereof is contemplated, this aspect of the engine shall not be elaborated upon.

As there is one valve lifter rocker arm 3 associated with every piston, it is obvious, in a multi-piston engine, that there will be one valve lifter rocker arm 3 which will move unidirectionally throughout the phase during which the piston in another cylinder approaches, passes through, and departs from top dead center, e.g. when the crank pin in its cylinder is in the position $a$ in FIG. 2. There will then be one position of the valve lifter rocker arm 3 which has been selected in which it reflects accurately, in the course of said unidirectional movement, the top dead center position of the piston to be tested. It is the function of the device according to the invention to create an electrical impulse in a circuit which may include a capacitor 4 (FIG. 1). This impulse may then be utilized in a strobe lamp 5 (which is associated with coils 6 and 7 and certain other, commonly known components 8) to illuminate the graduations on a fly wheel 9 or to trigger the horizontal sweep 45 on an oscilloscope 10 (FIG. 4), or provide a pip at top dead center or at a known degree of rotation of the crank from top dead center.

In order to create an impulse, it is necessary to break a circuit including a coil 6 and path for the magnetic flex from said coil 6. The circuit may have a capacitor 4 associated therewith to increase the abruptness of said break. This is accomplished by means of a breaker rod 11 which rides the valve lifter rocker arm 3 and deflects the moveable leaf 12 of a switch assembly 13 (FIGS. 1 and 3). This breaks a circuit which normally includes a first ground connection 13 (FIG. 1), battery 14, coil 6, connector leaf 15, bolt 16, leaf spring 17, moveable leaf 12, upper contact 18, lower contact 19, switch plate 20, base plate 21, and second ground connection 22. Insulators 23, 24 and 25 (FIGS. 1 and 3) are provided to protect the circuit as shown. As soon as the circuit is broken between the contact points 18 and 19 (FIG. 1), the capacitor 4, which is provided in a circuit branch including the bolt 16 and connector leaf 26 and leading to a third ground connection 27 quenches in known manner the arc which would otherwise occur between points 18 and 19. This induces a pulse in coil 7 to trigger the strobe mechanism 8 and set off the lamp 5.

For the purpose of the preferred embodiment chosen to illustrate the invention, the base plate 21 is joined by means of bolts 28, nuts 29 and washers 30 to the rocker arm cover 31. The interponent 32 serves as a spacer and at the same time as a guide for the breaker pin 11. A threaded cup 35 is provided which embraces a spring 36 and can be turned within a block 34 (integrally attached to the angle 33) to regulate the pressure upon the breaker pin 11 for smooth operation in following the valve lifter rocker arm 3.

The practical application and use of the device are as follows: After the device has been attached as shown in FIG. 1, the cup 35 is adjusted to insure smooth following of the breaker pin 11. The adjustment screw 37 is then released and by means of a screwdriver inserted into adjustment slot 38 and, further, adjustment slot 39, the switch plate 20 moved about a pivot 40 until the gap between contacts 18 and 19 has the desired characteristic.

The criterion for the setting is to have the break occur exactly at the top dead center position of the piston to be checked. The strobe lamp 5, aimed at the markings 9a on the flywheel 9 will indicate the setting by comparison with a marker 41 which is somewhere attached to the engine and stationary. The adjustment of the contacts 18 and 19 are adjusted so that the strobe light lights when the 0 of scale 9a is opposite pointer 14. For the sake of simplicity no effort has been made to show the physical connection of marker 44, as such arrangements are well known. As soon as the top dead center setting has been achieved, the adjustment screw 37 is tightened to preserve the setting.

Although the device is described as having been adjusted to indicate top dead center, it might be equally useful when adjusted to any other position, e.g. five degrees before top dead center if the timing of the pip and trigger for the horizontal sweep is known relative to the position of the crank shaft in order to interpolate the timing of the spark in question during the operation of the engine being analyzed. Since the adjustment of the device for top dead center (or for any other setting if that should be desired), has resulted in essence in a timing of the impulse required to trigger the strobe lamp, the same impulse may then be applied by means of switching arrangements well known and therefore not elaborated upon beyond the showing of a lead 42 (FIG. 4), to an oscilloscope or any other device actuable by impulses.

In the preferred embodiment illustrated and described, the top dead center impulse could be used to trigger the horizontal sweep and produce a top dead center pip on the oscilloscope 10. The horizontal distance from the vertical top dead center pip to the spark impulse image for the cylinder in question gives the degree of spark advance. The degree of spark advance is an important consideration in smog control devices. Such information on spark advance is not generally available on scope pictures of ignition impulses where the horizontal sweep is triggered by the impulse going to a spark plug.

Impulses taken from the ignition circuit (not shown) are brought in through a lead 43 to provide the vertical component of the ignition impulses.

In an 8-cylinder engine, there would be 8 ignition indices on the horizontal sweep, as indicated at 44, to the one top dead center index indicated at 45. For larger scale analysis, the horizontal may be expanded so as to seem less than the impulses from each spark plug of the engine.

It will further appear that the device is readily adaptable to large scale testing of vehicles, in limited time for testing. Also for checking spark advance at various speeds, etc. Thus, if automotive manufacturers could be induced to provide properly located holes 46 for the admission of the breaker pin 11 and locating holes 47 (which are in FIG. 1 used to admit the bolts 20), it would be possible to apply the device by means of strong magnets for transient checking. Fixed pins extending from the interponent 32 would then locate the device. The breaker pin 11 could be made adjustable in length to accommodate variations between various designs.

Although the invention has been described with reference to but one preferred embodiment, and only a few other applications have been mentioned, it will be obvious to those skilled in the art that many changes in the construction and application are possible without departing from the spirit and scope of the invention. The disclosures and description herein are therefore purely illustrative and are not intended to be in any sense limiting.

We claim as our invention:

1. A device for indicating the top dead center position of a piston reciprocating in a cylinder of an internal combustion engine having a plurality of pistons and cylinders comprising valves for controlling the flow of fluid into and out of the cylinders, means for operating said valves in timed relation to the pistons, a switch actuated by said means for operating an electric circuit when the piston is at top dead center, and an indicator operated by said circuit for indicating said top dead center of the piston.

2. A device as defined in claim 1 wherein the means for operating said valves comprises a cam shaft and rocker arms between said shaft and valves and wherein said switch comprises a follower in contact with a rocker arm.

3. A device as defined in claim 2 wherein the indicator is a lamp and a scale oriented to be made visible by the light of the lamp.

4. A device as defined in claim 2 wherein the indicator is the trace of an oscilloscope.

References Cited

UNITED STATES PATENTS

| | | | |
|---|---|---|---|
| 2,658,812 | 11/1953 | Smith | 73—119 X |
| 3,076,332 | 2/1963 | Lopes | 73—117.2 |
| 3,101,611 | 8/1963 | Traver | 73—117.2 |
| 3,238,771 | 3/1966 | Myrtetus et al. | 73—117 |

RICHARD C. QUEISSER, Primary Examiner

JERRY W. MYRACLE, Assistant Examiner

U.S. Cl. X.R.

33—180; 324—16